L. W. WOODEN.
HARROW AND SEEDER.
APPLICATION FILED OCT. 15, 1917.

1,289,994.

Patented Dec. 31, 1918.

Inventor
Luther W. Wooden

By

Attorney

UNITED STATES PATENT OFFICE.

LUTHER W. WOODEN, OF STITZER, WISCONSIN.

HARROW AND SEEDER.

1,289,994.  Specification of Letters Patent.  Patented Dec. 31, 1918.

Application filed October 15, 1917. Serial No. 196,740.

*To all whom it may concern:*

Be it known that I, LUTHER W. WOODEN, a citizen of the United States, residing at Stitzer, in the county of Grant and State of Wisconsin, have invented certain new and useful Improvements in Harrows and Seeders; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in grass seeder attachment for harrows, the object in view being to produce a simple and efficient apparatus of this nature, which may be easily applied to an ordinary harrow and so arranged that the seed may be sown near the ground without blowing away.

The invention consists essentially in the provision of a hopper mounted upon the harrow and provided with a seeding device driven by a toothed wheel running upon the ground and having gear connection with the agitator shaft in the hopper.

The invention consists further of various details of construction, combinations and arrangements of parts, which will be hereinafter fully described, shown in the accompanying drawings and then specifically defined in the appended claim.

I illustrate my invention in the accompanying drawings which, with the letters of reference marked thereon, form a part of this specification and in which.

Figure 1:
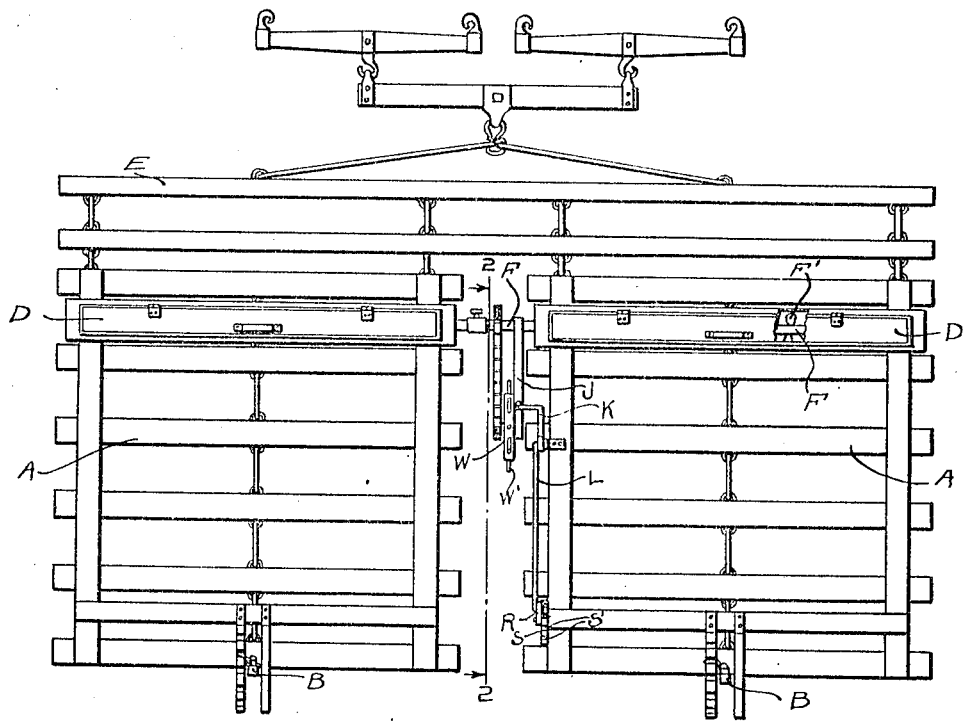
Figure 1 is a top plan view of my invention.
Figure 2:
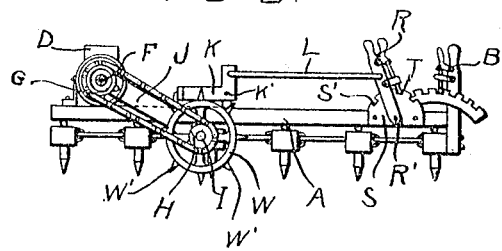
Fig. 2 is a sectional view on line 2—2 of Fig. 1, showing the parts in elevation.

Reference now being had to the details of the drawings by letters.

A designate harrows, which may be of any form of construction, provided with a lever B for tilting the same. A hopper D is adapted to contain the seed and is mounted upon the harrow in any convenient manner, preferably near the forward sections of the harrow, and so positioned that the exit end of the hopper will be adjacent to the ground, in order to prevent the wind blowing the seed. An evener E is connected to the harrow and to which whiffletrees may be attached.

Said hopper is provided with a rotatable shaft F mounted in suitable bearings and having agitator fingers F' mounted thereon to facilitate the feeding of the seed through the exit opening in the hopper. A sprocket wheel G is keyed to said shaft and has chain connections with a sprocket wheel H fixed to a stub shaft I, which is carried by the link J, which in turn is pivotally mounted upon the shaft O journaled in bracket arms upon the harrow. An angle lever K is pivotally mounted upon a pin K' upon a bracket member upon the harrow and has pivotal connection at one end with the link J and its other end with a rod L which is connected to a lever R, and which latter is pivotally mounted upon a pin R', secured to the segment S having notches S' in its edge adapted to be engaged by a pawl T carried by the lever. A wheel W is mounted on and rotates with the sprocket wheel H and has spurs W' projecting from its circumference and which are adapted to cut into the earth when the wheel W is lowered to the ground and for the purpose of imparting a rotary movement to the agitator shaft within the hopper.

In operation, when it is desired to rotate the shaft having the agitator fingers in the hopper, the wheel W is thrown down through the medium of the lever R and as the harrow is drawn over the ground, the shaft will be rotated and the seed loosened up and permitted to fall through the exit opening in the hopper. When it is desired to throw the stirrer shaft out of gear, it may be done by the operator swinging the lever R and causing the wheel W to be thrown up so that the spurs thereon will be out of engagement with the ground.

What I claim to be new is:

The combination with two transversely-spaced harrow frames, hoppers at the forward ends thereof, a shaft common to both hoppers, each frame comprising bars spaced apart in the same horizontal plane and having teeth thereon, a draft frame to which the front ends of said harrow frames are connected, a drag bar on said shaft between the harrow frames, a spiked wheel mounted on the lower end of said drag bar, driving connections between said shaft and said wheel for operating hopper-discharging mechanism in said hoppers as the harrows traverse the ground, means for raising and lowering the drag bar with its spiked wheel consisting of a lever pivoted on one of the harrow frames at its rear and inner end, and connections between said lever and drag bar.

In testimony whereof I hereunto affix my signature in presence of two witnesses.

LUTHER W. WOODEN.

Witnesses:
R. A. GOODELL,
IRA O. POLLER.

Copies of this patent may be obtained for five cents each, by addressing the "Commissioner of Patents, Washington, D. C."